United States Patent [19]
Schmidt et al.

[11] Patent Number: 5,867,660
[45] Date of Patent: Feb. 2, 1999

[54] METHOD AND APPARATUS FOR COMMUNICATING BETWEEN A NETWORK WORKSTATION AND AN INTERNET

[75] Inventors: Jonathan Schmidt; Lewis Donzis; Henry Donzis; John Murphy; Peter Baron, all of San Antonio, Tex.

[73] Assignee: Bay Networks, Inc., Santa Clara, Calif.

[21] Appl. No.: 439,136

[22] Filed: May 11, 1995

[51] Int. Cl.[6] ................................................ G06F 13/00
[52] U.S. Cl. ........................ 395/200.57; 395/200.58; 395/200.59; 395/200.6
[58] Field of Search ................ 395/200.02, 200.01, 395/200.21, 200.2, 200.57, 200.58, 200.59, 200.6; 364/DIG. 1

[56] References Cited

U.S. PATENT DOCUMENTS

| | | | |
|---|---|---|---|
| 5,150,464 | 9/1992 | Sidhu et al. | 395/200 |
| 5,185,860 | 2/1993 | Wu | 395/200 |
| 5,309,437 | 5/1994 | Perlman et al. | 370/85.13 |
| 5,353,283 | 10/1994 | Tsuchiya | 370/60 |
| 5,355,365 | 10/1994 | Bhat et al. | 370/85.13 |
| 5,363,121 | 11/1994 | Freund | 395/600 |
| 5,410,754 | 4/1995 | Klotzbach et al. | 370/85.13 |
| 5,446,736 | 8/1995 | Glesson et al. | 370/85.13 |
| 5,491,800 | 2/1996 | Goldsmith et al. | 395/200.12 |
| 5,499,343 | 3/1996 | Pettus | 395/200.03 |
| 5,550,984 | 8/1996 | Gelb | 395/200.17 |
| 5,583,940 | 12/1996 | Vidrascu et al. | 380/49 |
| 5,674,003 | 10/1997 | Andersen et al. | 364/514 |

OTHER PUBLICATIONS

John, "Hassle–free Internet" PC magazine, pp. 1–5, Jul. 1995.

*Primary Examiner*—Alyssa H. Bowler
*Assistant Examiner*—Dzung C. Nguyen
*Attorney, Agent, or Firm*—Blakely Sokoloff Taylor & Zafman, LLP

[57] ABSTRACT

An apparatus and method for connecting a plurality of LAN workstations to the internet via an on-line server/interface that does not require a PC operating system dedicated to the server. The server operates in TCP/IP protocol for communication over the Internet. Only a single connection to the Internet is required in order to permit the entire LAN to operate simultaneously on the Internet. Specifically, only a single phone line is required to simultaneously serve all LAN workstations. The system is equally well suited to connect via a telephone line connection to an Internet providers's slip or PPP or via an Ethernet connection to a router or direct connection by any available means. The system does not disturb the native LAN protocol, while communicating via the internet protocol such as, by way of example, TCP/IP. The LAN is provided with a complete internet protocol service, supporting functions not generally available in the dedicated stacks previously provided for individual PCs.

39 Claims, 8 Drawing Sheets

Fig. 8

METHOD AND APPARATUS FOR COMMUNICATING BETWEEN A NETWORK WORKSTATION AND AN INTERNET

BACKGROUND OF THE INVENTION

1. Field of the Invention

The subject invention is directed to an on-line interconnect system for connecting a terminal with an internet and is specifically directed to the method and apparatus for enabling PC workstations on a local area network (LAN) to access the TCP/IP protocol internet without alteration of the PC hardware configuration and without the need for communication with a LAN server provider having a TCP/IP protocol stack.

2. Discussion of the Prior Art

An internet is a collection of disparate physical computer networks which are interconnected to function as a coordinated unit. The Internet is the interconnected network which includes the Defense Advanced Projects Research Agency (DARPA), the National Science Foundation (NSF), the Department of Energy (DOE) and the National Aeronautics and Space Administration (NASA), as well as most other research institutions, colleges and universities, and recently, most large companies. The Internet operates entirely under the protocol TCP/IP. Computers which communicate over the Internet must either use TCP/IP protocols or a TCP/IP protocol service provider.

Over the years local area networks or LANs have evolved and developed with protocols which are much simpler and more efficient than TCP/IP. The protocols do not require individual address management, or accessory functionality such as name servers to maintain the order of the membership. They were specifically designed to utilize a minimum memory capacity. While such systems are very useful for the intended purpose of linking a plurality of workstations to a central processor and to each other, they did not anticipate or plan for the need or desirability to permit each individual workstation to independently communicate via the Internet.

Several prior art systems have been developed with the objective of permitting LAN workstations to communicate with the Internet utilizing the required TCP/IP protocol. Initially, a second protocol, TCP/IP was added to each PC's native LAN protocol or the LAN was converted to exclusive use of the TCP/IP protocol. IBM, Microsoft and Novell are examples of companies providing a second or conversion protocol. The difficulty with these solutions were the installation and management of TCP/IP stacks in the LAN PCs, more memory utilization for the protocol and a slowdown of normal LAN operation due to the inherent inefficiencies of TCP/Ip protocol when used as a LAN protocol.

These problems were reduced by introduction of a shared TCP/IP into an existing server, which eliminated the TCP/IP from the LAN workstations and permitted the LAN to operate in its native protocol. These solutions relied upon existing PC operating systems for the server, the TCP/IP for these systems housing the server and the LAN interface used by the server. Many such systems relied upon a special code or on start-up facilities to be installed in each LAN PC. Examples of such systems include Firefox and Internetware (for Novell NetWare servers), Ipswitch (OS/2) and Fel (Windows). All require a PC operating system to house the server and to provide access to the native LAN protocols. While such systems did eliminate the need to convert the LAN protocol and reduced the use of memory and the alteration of the LAN client PCs, each proved costly to install and maintain.

There have also been a number of recently issued patents which disclose systems for interconnection of various terminals across different networks by mapping or providing different protocol schemes, where the computers have different protocols or different communications architecture. For example, U.S. Pat. No. 5,353,283, issued to P. F. Tsuchiya, et al, on Oct. 4, 1994, discloses a method for use in a large communication internet with several interconnected networks having one or more interconnected nodes. Specifically, an algorithm is provided for writing a sequence of one or more identifiers suitable for use in indexing a forwarding table at each node in a special routing section of each packet to be transmitted via the internet, to provide a routing method adapted to achieve different routing criteria and styles to accommodate varying structures and architecture.

U.S. Pat. No. 5,355,365, issued to D. Bhat, et al, on Oct. 11, 1994, provides for a share modem resource to PCs connected through a LAN and to off network PCs.

Various other methods and apparatus have been developed to provide access to various internets from individual workstations of a LAN. However, to date, all of the systems available require at least a partial combination of expensive hardware additions to either the LAN in the form of a PC server or to each workstation of the LAN; substantial memory utilization; use of a protocol service provider and/or limited simultaneous access to the internet via the shared system, for example, one user at a time on a shared modem.

It is, therefore, desirable to provide an internet access system wherein each LAN workstation can simultaneously directly communicate with the internet without requiring substantial hardware modification or DOS memory utilization in existing LAN workstations or servers.

SUMMARY OF THE INVENTION

The subject invention is directed to a method and apparatus for connecting a plurality of LAN workstations to the internet via an on-line server/interface that does not require a PC operating system dedicated to the server. In the preferred embodiment the server operates in TCP/IP protocol for communication over the Internet. Unlike prior art systems, the subject invention utilizes only a single connection to the internet in order to permit the entire LAN to operate simultaneously on the Internet. Specifically, only a single phone line is required to simultaneously serve all LAN workstations. The method and apparatus of the subject invention is equally well suited to connect via a telephone line connection to an Internet providers's SLIP or PPP or via an Ethernet connection to a router or direct connection by any available means.

The method and apparatus of the subject invention is a unique construction, not relying on a PC operating system, but is a dedicated system specifically designed for connecting a LAN to the internet without disturbing the native LAN protocol, while communicating via the internet protocol such as, by way of example, TCP/IP. The resulting system supplies a very high performance protocol facility equal to or exceeding that of the dedicated stacks provided for individual PCs at a fraction of the cost. The LAN is provided with a complete internet protocol service, supporting functions not generally available in the dedicated stacks previously provided for individual PCs. In the preferred embodiment the system provides a TCP/IP service to the LAN with support for broad compatibility with all WINSOCK applications which previously were run on dedicated PC stacks.

The subject invention provides full internet connection without any alteration of the LAN hardware and with minimum memory utilization. The configuration of the preferred embodiment does not require PC operating system support and does not rely on the existing LAN processors to be used as TCP/IP protocol servers. A significant feature of the invention is the simplicity of installation and the minimization of management requirements once installed. Basically, a "black box" is connected, on-line, to the LAN data line, and connected to a standard telephonic line system in order to connect each LAN workstation, individually, to the internet. Simultaneous use of the internet by each of the LAN workstations is supported by the integrated server of the present invention.

By way of comparison, the internet access system of the subject invention works in the manner of a multi-plex switching network for multiple telephone stations, wherein each telephone station has direct access to outside lines through a central unit, but may bypass the central unit entirely when communicating within the network. The subject invention does not interfere with the internal LAN communications, but provides access directly to the internet using the internet protocol.

The system of the subject invention is a "from-the-ground-up" unique approach to providing LAN communications with the internet. The architecture of the preferred embodiment eliminates the need for support from existing operating systems with its TCP/IP stack, such as, by way of example, Windows, Windows 95, NT, OS/2, UNIX or NetWare server NLM. Each of these operating systems require substantial memory, supporting hard disk drives, and often supporting peripherals. They also provide inadequate support from their TCP/IP stacks resulting in slow performance, and often instability and incomplete functionality.

It is, therefore, an object and feature of the subject invention to provide a system for connecting LANs to the internet without requiring a PC operating system, wherein all of the LAN workstations can communicate with the internet via a single telephone line or other single point of network access.

It is another object and feature of the subject invention to provide a system wherein the LAN continues to operate in its native protocol, without modification, while having the capability of communicating with the internet utilizing the internet protocol.

It is yet another object and feature of the subject invention to provide a system supplying a high performance TCP/IP facility equal to or exceeding that of dedicated TCP/IP stacks without requiring or using PC operating support.

It is an additional object and feature of the subject invention to provide a simple, easy-to-use box to bring internet services to every PC workstation on a LAN without interfering in any manner with the operation of the LAN.

Other objects and features of the invention will be readily apparent from the drawings and detailed description of the preferred embodiment.

DETAILED DESCRIPTION OF THE PREFERRED EMBODIMENT

The preferred embodiment of the subject invention is specifically configured to support LAN communications with the TCP/IP Internet. Although the initial intent of the Internet was to provide broad access to supercomputers from universities, the market has changed with access available to any PC user. The vast majority of users demand Internet electronic mail and access to databases of files, interactive computing and on-line information.

One of the largest potential markets for Internet is the interconnectivity of local area networks (LANs). The number of LANs has nearly doubled in the last two years and is expected to accommodate an ever increasing portion of PCs. Typically, each LAN system is developed with a dedicated, native protocol specifically designed to support the LAN operation. The TCP/IP protocol of the Internet is not normally utilized as a native LAN protocol because it is unwieldy, making the LAN operation inefficient. It is now desirable, if not necessary to provide a means and method for connecting the LAN PCs with the internet.

The subject invention provides a unique system which is simple, easy-to-install and brings Internet services to every PC on a LAN without threatening the smooth and continuing operation of the LAN. The system can be readily adapted to support all known, popular PC LAN operating systems. Further, it can be readily modified to support additional systems by the installation of necessary drivers.

It can be connected and used while the LAN is operating. Workstations can immediately begin accessing the Internet without reconfiguring, rebooting or even restarting Windows. Management of user access rights and security are handled through the LAN operating system's regular user and group administration. The preferred embodiment of the invention supports both Novell NetWare and Performance Technology POWERLan LAN operating systems. In the preferred embodiment, up to fifty simultaneous applications can be connected to the Internet at one time. For larger LANs, additional systems may be added to increase the capacity in multiples of fifty. Of course, other configurations may be readily adapted for supporting a LAN of any particular size. One pair of connections provides total LAN Internet access.

Using the system of the present invention, the workstations have true TCP/IP participation in the Internet, not a "shell-only" or a "mail-only" access. A Web browser, such as, by way of example, WINWEB is supplied for Web browsing, news reading and FTP (file transfer protocol) client services. The hardware connects to the LAN in the same manner as any other LAN workstation. Connection to the Internet is via dialup with a telephone connection or via router with an Ethernet connection. LAN user access rights to Internet activity are driven completely through the existing user administration environment. There is no IP address assignment for each LAN client, i.e., the LAN uses one IP address accessible by all LAN users. Only the original protocol remains on the LAN. No supplementary bridging or routing is required.

In the preferred embodiment, outside access is completely blocked since there is no IP on the LAN and no LAN server or client exists as an IP-accessible host. Since the Internet is an enabling facility and not a secure facility, in prior art systems when the IP is on the LAN it is up to users to take appropriate precautions to provide for adequate security of their files. The preferred embodiment of the subject invention is a single purpose TCP/IP application and only the TCP/IP address and the fixed server application represent the LAN to the Internet, hence there is nothing to penetrate and user files are secure.

The system of the subject invention consists of two primary components:
1. the application software package, and
2. the hardware interface (including installation and configuration software).

The installation program configures the hardware directly via the native LAN protocol. It then creates a server-resident directory with applications, the DLLs and the client installation program. The Internet connection is made through a modem or router via connections, such as Ethernet and Token Ring, by direct attachment to the hardware. The LAN connection is made through direct attachment to the LAN in the same manner as any LAN workstation.

In the preferred embodiment, a remote procedure client server structure is used to create the Internet socket server facility, using WINSOCK. The WINSOCK specification is a standard from Microsoft. It specifies API (application program interface), which is used by programs acquiring TCP/IP services from within Windows when there is a TCP/IP stack in a Windows PC. Programs written to use the WINSOCK standard in Windows will work on any TCP/IP stack which is fully compliant with the standards. The preferred embodiment of the invention separates the interface from the TCP/IP stack. The WINSOCK interface in the invention is provided to all PCs on the LAN and it derives TCP/IP socket services from the TCP/IP stack in the socket server device. The choice of the division of processing responsibilities between the part provided to the PCs and the part supplied to the socket server device is unique to the invention.

Figure 1:
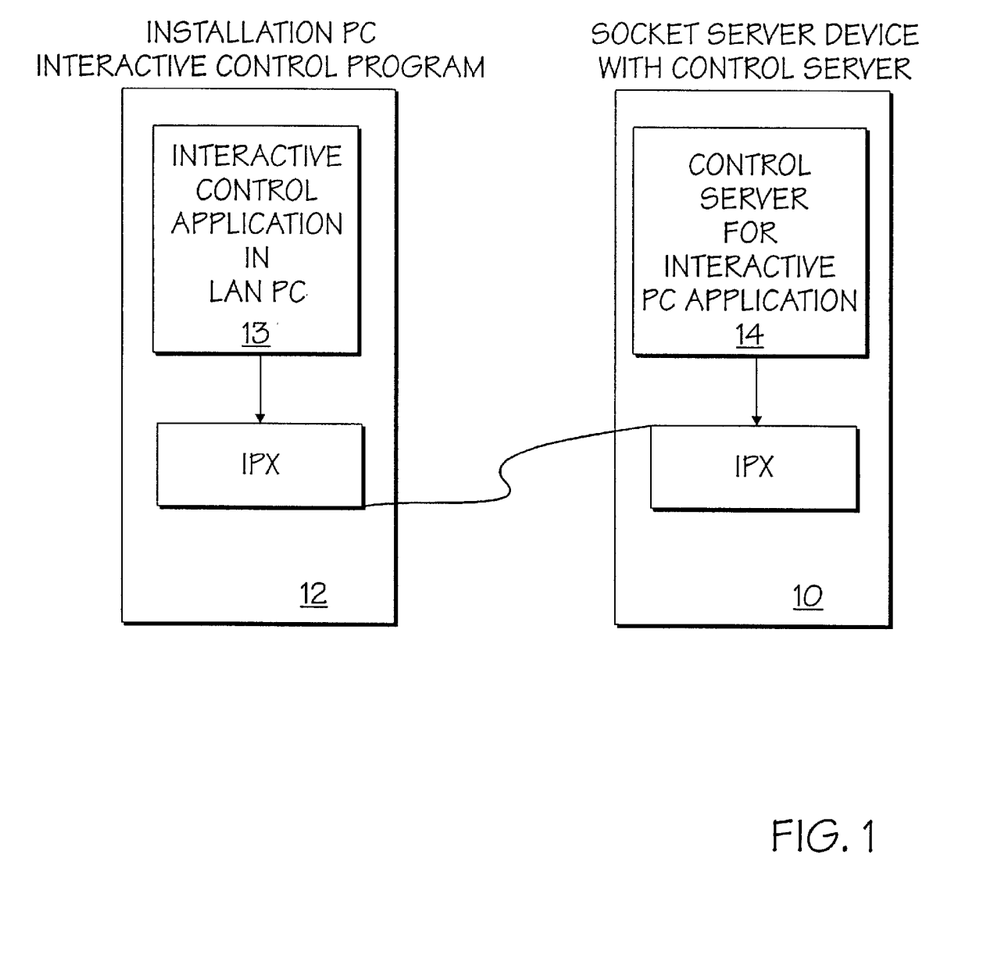
FIG. 1 illustrates the mechanism for controlling the device from a LAN PC during installation and maintenance.

FIG. 1 illustrates the mechanism for controlling the device 10 of the subject invention from a LAN PC 12 during installation and maintenance. The method for installation and maintenance requires a unique design due to the lack of any human interface directly with the device itself. A control server 14 is created and included in the socket server processing. In the preferred embodiment it is always active and is adapted to respond to the interactive control program 13 if it is run in any PC 12 on the LAN. The interactive control program permits the user to configure all parameters of the socket server device 10 and also permits viewing and editing operational scripts and files.

In the preferred embodiment, the TCP/IP stack in the device is designed to support at least up to 50 simultaneously operating WINSOCK interface users in a hardware device with limited memory of 2 MB and several times that with proportionally larger memory. The division of processing responsibilities between the user requesting the TCP/IP procedure and the remote implementation of the actual TCP/IP procedure makes this a remote procedure architecture.

Figure 2:
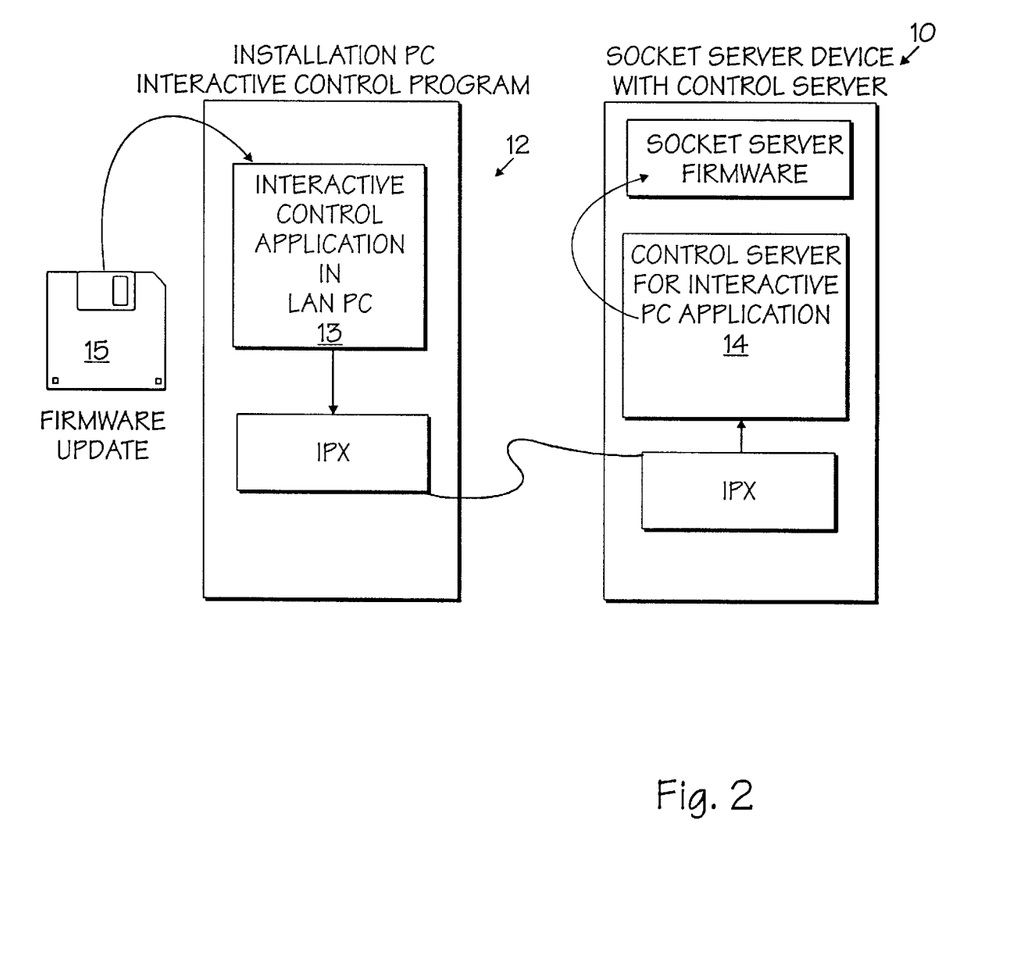
FIG. 2 illustrates the mechanism for remotely upgrading the firmware of the invention from a LAN PC.

The mechanism for firmware upgrade using a remote LAN PC is shown in FIG. 2. The socket server device 10 maintains its firmware in a suitable format, such as by way of example, MS-DOS format file. In the example, although the socket server and its operating system environment are not necessarily MS-DOS, it is initialized and loaded from MS-DOS and the file system is maintained as MS-DOS. With the availability of a NetBIOS interface (interrupt 5c) for interprocess communications provided on all LANs through the universal design of the subject invention, a file server is included in the functionality of the socket server device and in the preferred embodiment is designed to the specifications of the SMB redirector function and included in the interactive control program 13. The design of these programs, file servers and redirectors is well known to those who are skilled in the art of the subject invention, and has been documented to operate whenever an interrupt NetBIOS interface is available. The inclusion of these facilities enables the control program to read the updated version of the rewritable firmware from a floppy disk 15 or hard disk available in the PC, as desired, and to write it to the firmware file system in the socket server device 10 over the native LAN protocols. The updated file can be conveyed as a floppy disk or sent by the internet or electronic mail. The "UPDATE" action of the interactive control program facilities properly identifies the updated elements and causes the update.

Figure 3:
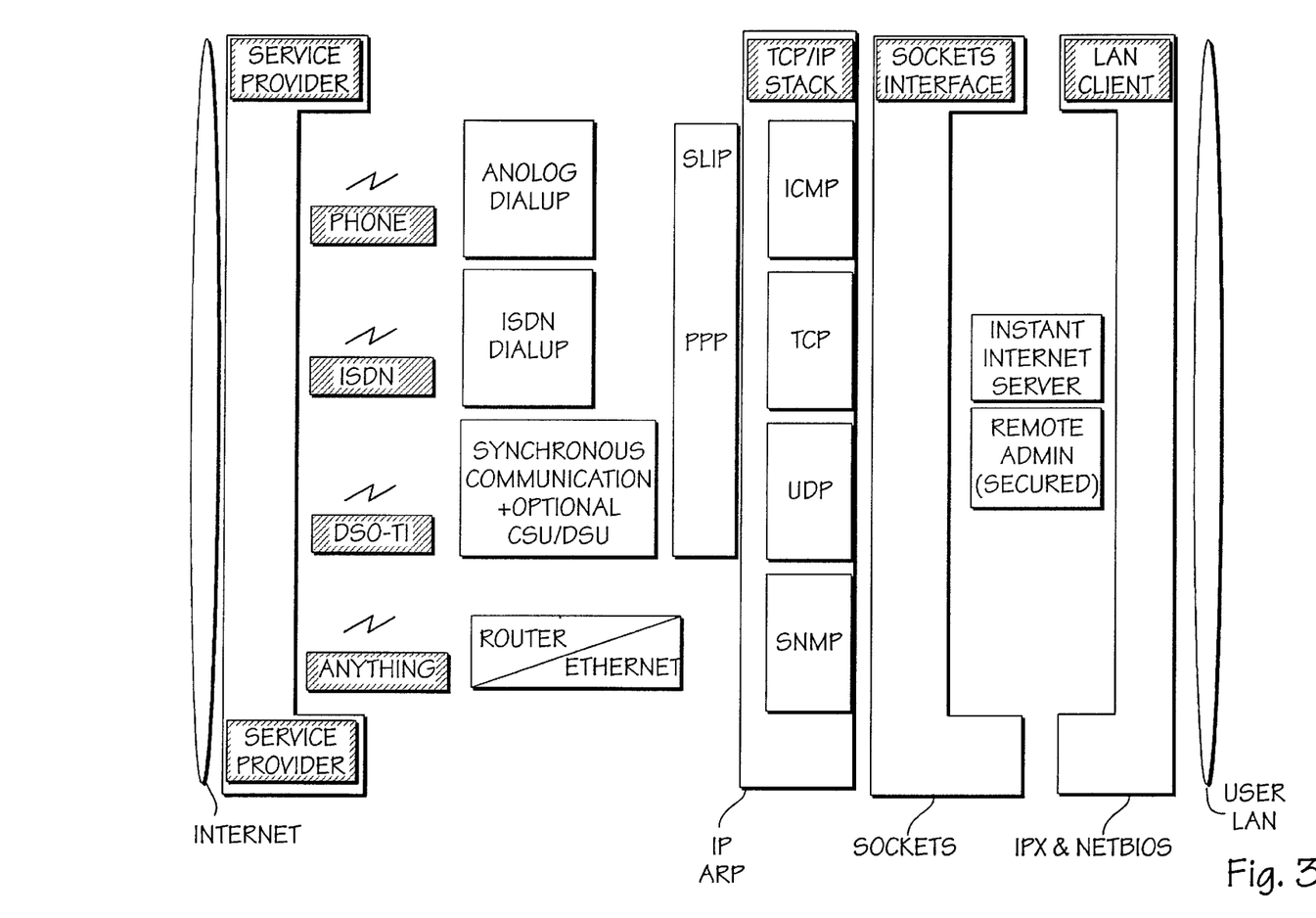
FIG. 3 illustrates the relationship between the PC LAN workstations, the PC LAN, the socket server device, and the Internet.
Figure 4:
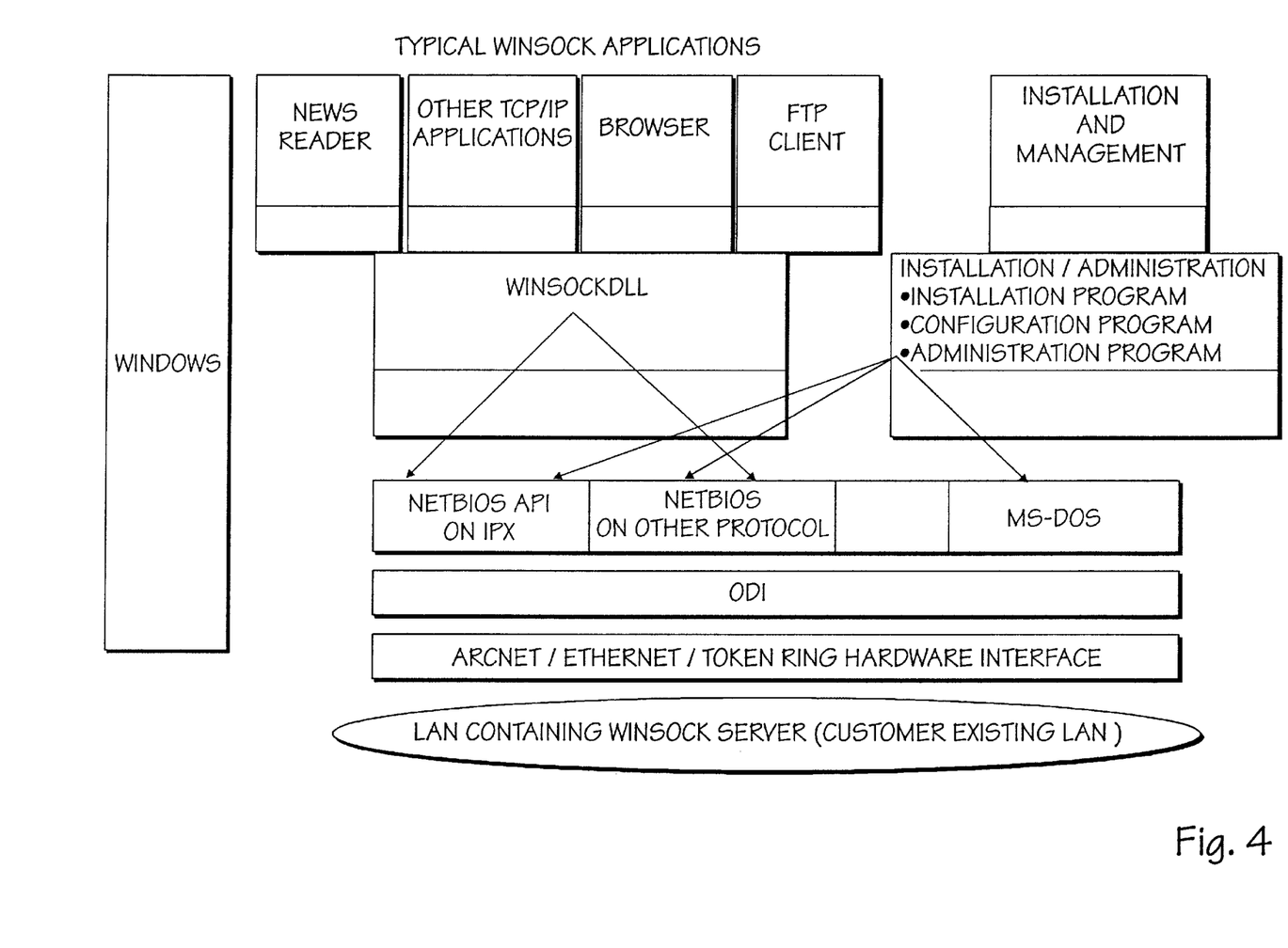
FIG. 4 is an overview functional block diagram of the socket server device.
Figure 5:
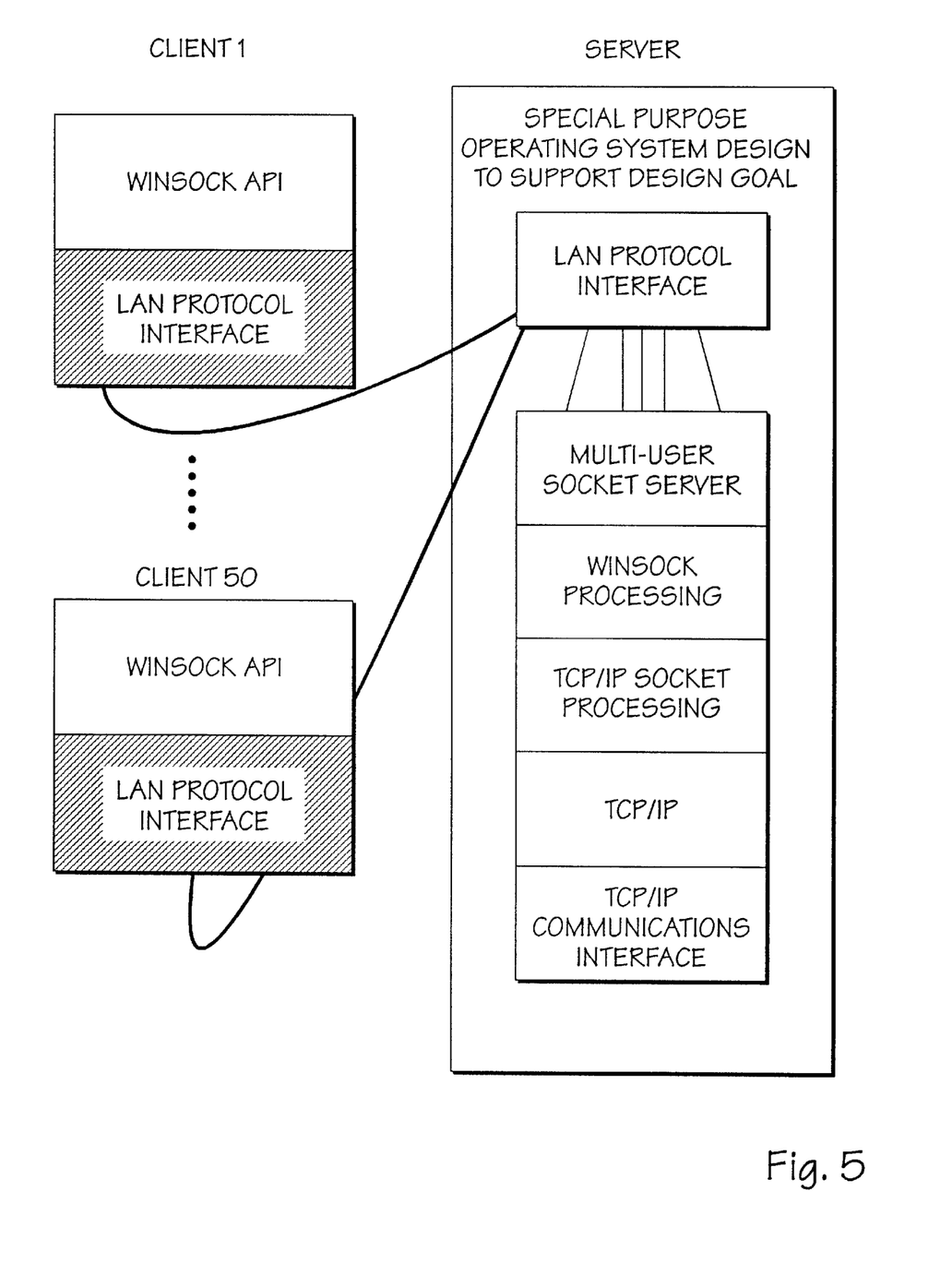
FIG. 5 is an overview functional block diagram of the PC LAN workstation interface to the TCP/IP sockets, the replacement WINSOCK.DLL which contacts the socket server device on behalf of the PC LAN user.
Figure 8:
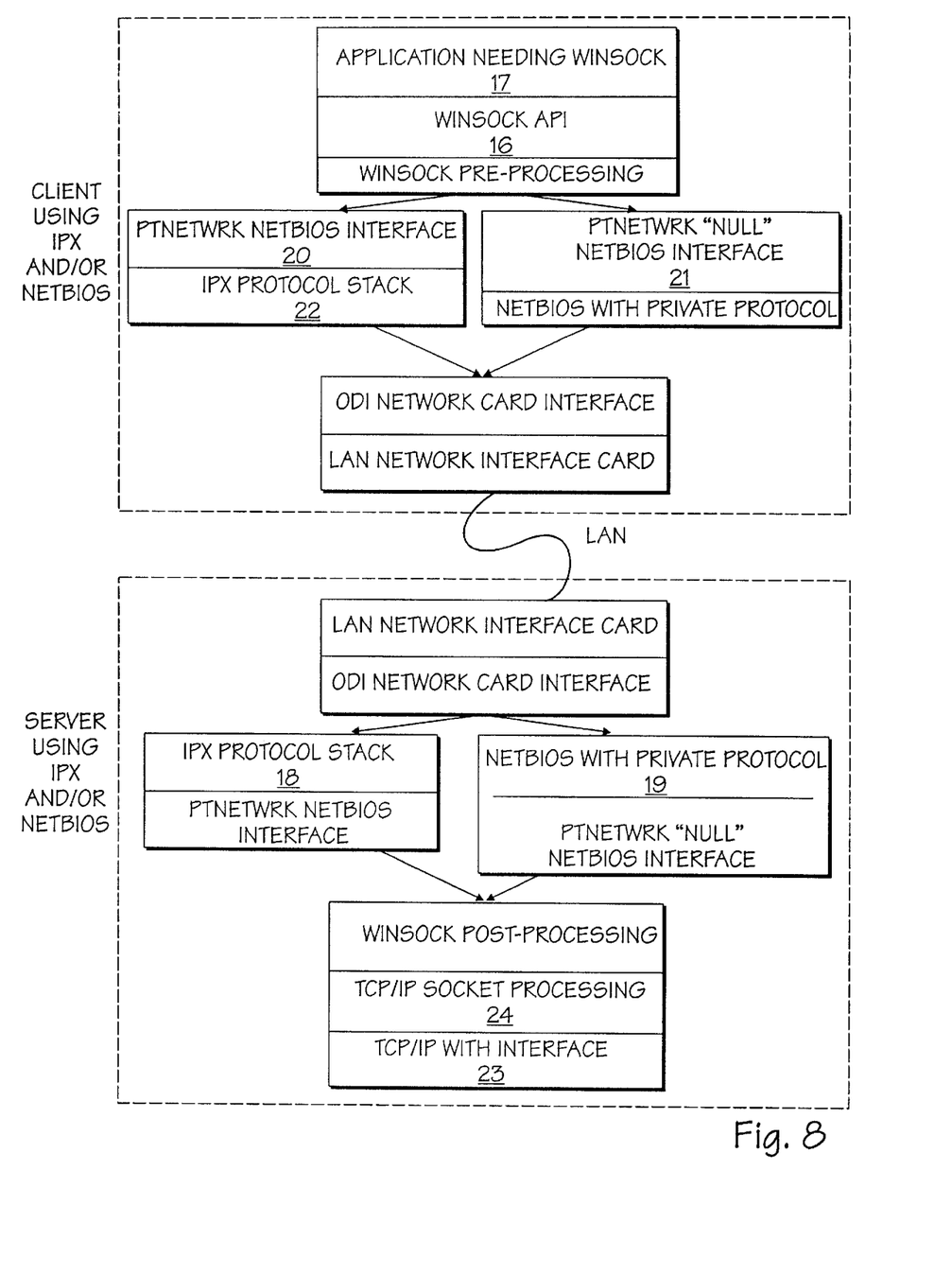
FIG. 8 is a diagram of the structure of the interprocess communications mechanism which permits porting to and simultaneous operations on a variety of LAN brands, topologies and protocols.

Turning now to FIG. 3, there shown is an overview of the relationship between the PC LAN workstations, the PC LAN, the socket server device, and the Internet, in accordance with the subject invention. FIG. 4 is an overview functional block diagram of the socket server device. FIG. 5 is an overview functional block diagram of the PC LAN workstation interface to the TCP/IP sockets, the replacement WINSOCK.DLL which contacts the socket server device on behalf of the PC LAN user. FIG. 8 is a diagram of the structure of the interprocess communications mechanism which permits porting to and simultaneous operations on a variety of LAN brands, topologies and protocols.

Figure 6:
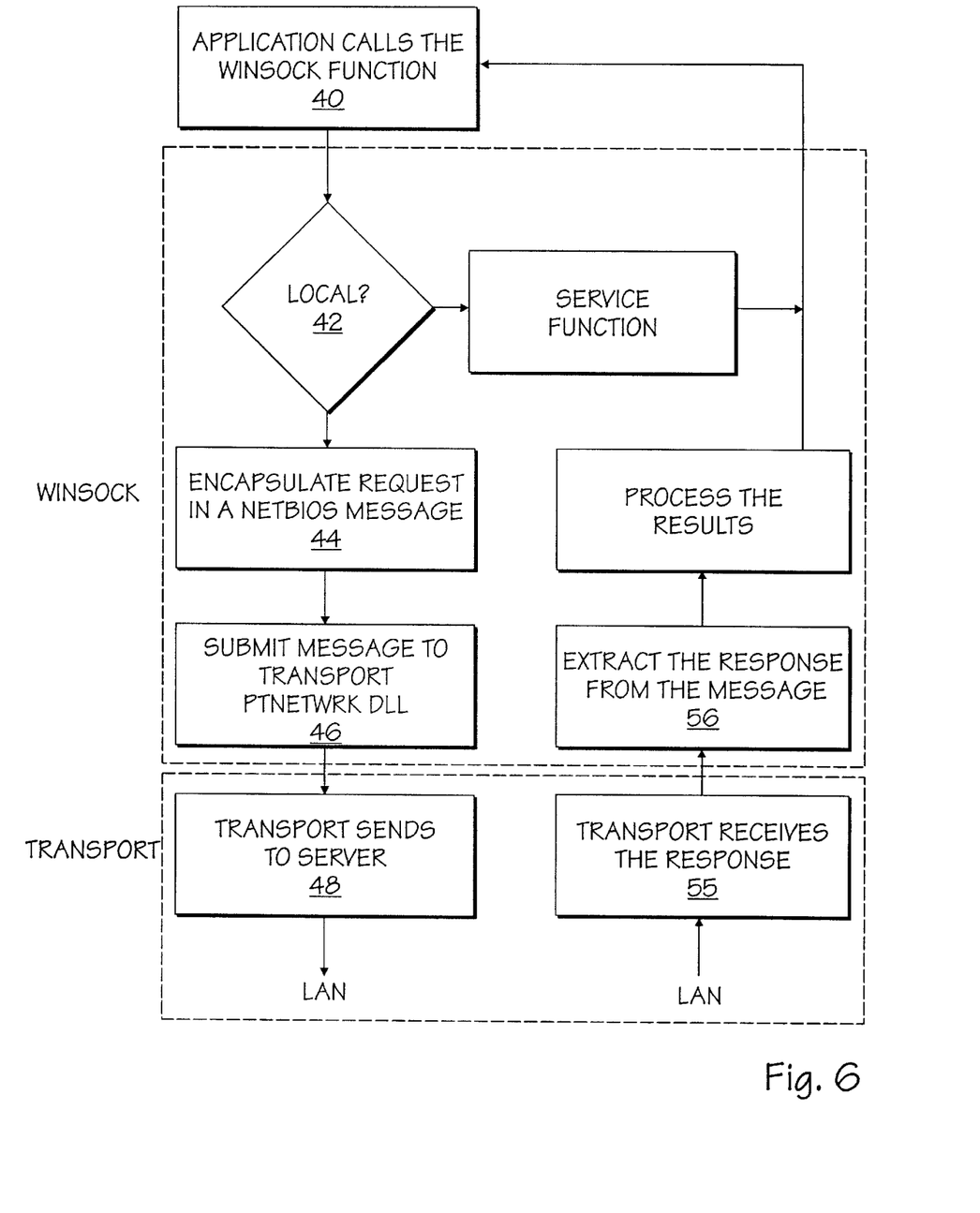
FIG. 6 is a flow diagram illustrating the operation of the PC LAN workstation interface software provided by the invention.
Figure 7:
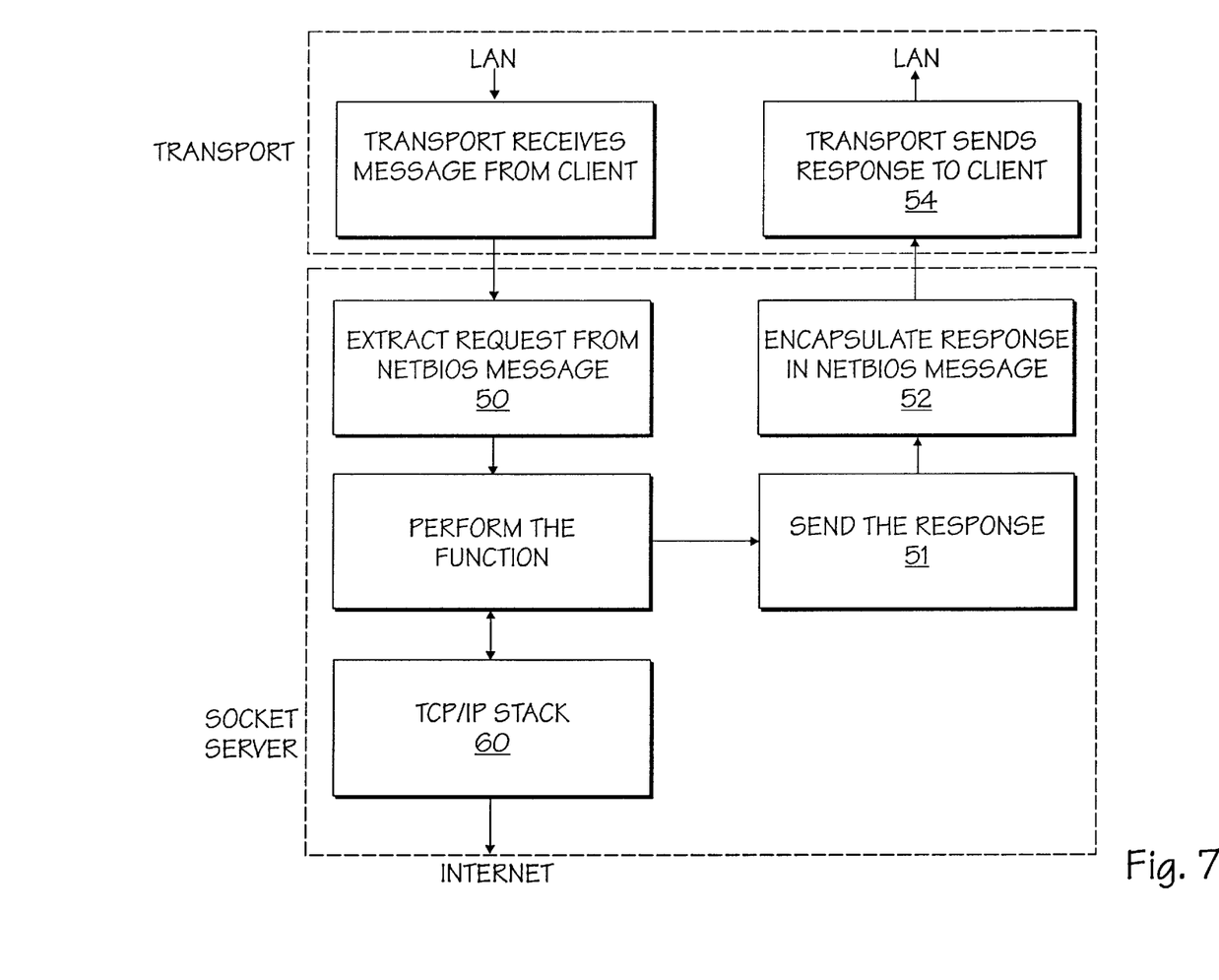
FIG. 7 is a flow diagram illustrating the operation of the socket server device in response to typical requests from the PC LAN workstation software.

FIGS. 6 and 7 are flow diagrams illustrating the operation of the PC LAN workstation interface software provided by the invention, and the operation of the socket server device in response to typical requests from the PC LAN workstation software, respectively.

As best shown in FIG. 8, the design is quite symmetric. The WINSOCK "veneer" 16, the WINSOCK DLL as supplied as part of system, supports the WINSOCK standard API on the applications, or top, end and a NetBIOS interface 18 on the bottom. NetBIOS is an interface specification used in some LAN operating systems for interprocess communications. Not all LAN operating systems use the NetBIOS interface specification but instead, may provide their own. However, NetBIOS provides a sufficiently complete set of services to support the WINSOCK DLL service requirements for communicating with the server of the invention when used on those LANs which do provide NetBIOS. For LANs which do not operate on a NetBIOS as the normal interprocess communications facility, an internal NetBIOS is provided, as shown at 19, which operates directly on the lowest communications level, the datagram. In Novell NetWare, this is the IPX layer, see 20. In this manner, the WINSOCK always finds a NetBIOS-interfaced interprocess communications facility and may remain unmodified across different LAN operating systems.

The preferred embodiment of the subject invention also provides a second DLL 21, which automates this configuration. If the user is operating on a LAN which provides a NetBIOS, the PTNETWRK.DLL at 21 intercepts the NetBIOS calls from the WINSOCK and simply reissues them. If the client is operating on a LAN such as NetWare, which does not provide a NetBIOS, the PTNETWRK NetBIOS Interface 20 intercepts the NetBIOS calls but completely processes the NetBIOS operation and utilizes the datagram layer 22, IPX in NetWARE, to convey the data to the server's corresponding NetBIOS.

In the server, a mirror image of the above process is performed. In the mirror image visualization, the TCP/IP stack 23 corresponds to the application 17 in the user, the socket server 24 corresponds to the WINSOCK 16, and above that is the equivalent of the PTNETWRK.DLL, NetBIOS 20 (if used) and the IPX driver. In fact, the NetBIOS and the IPX, if used, are the exact same code modules as used in the client. The PTNETWRK.DLL in the client would also be the same code as used in the client except that the server is not running Windows and does not require or support a driver in the DLL format.

The invention utilizes a special-purpose TCP/IP stack and socket processor, permitting an architecture which provides the WINSOCK API in the client with the services on non-blocking and asynchronous WINSOCK calls. The non-blocking or asynchronous calls required by complete WINSOCK compliance imply the capability of callback mechanisms in the TCP/IP stack. That is, the TCP/IP functionality can be invoked with a call which instructs it to initiate the operation and to interrupt or call back to the applications when it has completed, successfully or unsuccessfully. This permits the application to go about other operations while the TCP/IP attempts to fulfill its instruction. The lack of callback functionality in most existing PC stacks mean that server-based designs which utilize these stacks must either provide no non-blocking or asynchronous WINSOCK functionality or must provide it with an imitation of real asynchronous operation.

The method for installation and maintenance is designed to accommodate the lack of any human interface on the device. A control server is created and included in the socket server processing. It is always active and will respond to the interactive control program at the client PC if it is run in any PC in the LAN. The permits the user to configure all parameters of the socket server device and also to view and edit operational scripts and log files. The preferred embodiment of the invention separates the interface from the TCP/IP stack. The WINSOCK interface in the invention is provided to all PCs on the LAN and it derives TCP/IP socket services from the TCP/IP stack in the socket server device. The choice of the division of processing responsibilities between the part provided to the PCs and the part supplied to the socket server device is unique to the invention.

The socket server device maintains its firmware in a convenient format which, in the preferred embodiments an Intel-based MS-DOS platform format file, although the socket server and its operating system environment are not MS-DOS. This format readily permits storage on and communication through the use of a standard PC. While other schemes may be utilized, in the preferred embodiment the socket server is initialized and loaded from MS-DOS and the file system is maintained as MS-DOS.

With the use of a consistent NETBIOS interface for interprocess communications provided on all LANs through the universal design of the subject invention, a file server is included in the functionality of the socket server device which is designed to the specifications of the SMB protocol typically used in MS-DOS servers in peer-to-peer LANs. A corresponding SMB redirector function is included in the interactive control program. The design of these programs, file servers and redirectors is well known and documented to work providing that an interrupt NetBIOS interface is available, as it is in the invention. The inclusion of these facilities enables the control program to read the updated version of the rewritable firmware from a floppy disk or hard disk available to the PC and to write it to the firmware file system in the socket server device over the native LAN protocols. The updated file can be conveyed as a floppy or sent by the Internet or electronic mail. The UPDATE action of the interactive control program facilities properly identifies the updated elements and causes the update.

The information processing by the system in accordance with the subject invention is more clearly shown in the flow diagrams of FIGS. 6 and 7, wherein FIG. 6 is a flow diagram illustrating the operation of the PC LAN workstation interface software provided by the invention, and FIG. 7 is a flow diagram illustrating the operation of the socket server device in response to typical requests from the PC LAN workstation software. As there shown, the WINSOCK application's request 40, if not satisfied locally (42) is encapsulated in a netBIOS message 44 and submitted to the PTNETWORK.DLL universal netBIOS interface 46. The PTNETWORK.DLL assures a consistent, reliable connection to the server regardless of the LAN network operating system. The encapsulated message is conveyed by the LAN transport 48 to the server where it is extracted 50 and submitted to the socket server and TCP/IP stack 60 for processing, see FIG. 7. The response 51 is re-encapsulated 52, conveyed back to the client 54, 55 (FIG. 6) extracted 56 and given to the requesting client.

While certain features and embodiments of the invention have been described in detail herein, it will be understood that the invention includes all enhancements and modifications within the scope and spirit of the following claims.

What is claimed is:

1. A method for connecting a plurality of PC LAN workstations, interconnected via a socket server, to an internet, said method comprising the steps of:
   a. in a workstation,
      (1) generating a WINSOCK application request for TCP/IP services;
      (2) encapsulating the WINSOCK request in a message;
      (3) conveying the encapsulated message via a LAN transport to the socket server;
   b. in the socket server,
      (1) receiving the encapsulated message from the LAN transport;
      (2) extracting the WINSOCK request from the encapsulated message;
      (3) submitting the WINSOCK request to a TCP/IP stack;
      (4) processing the WINSOCK request by the TCP/IP stack; and
      (5) returning the processed WINSOCK request to the workstation via a reverse of steps A(1), A(2), A(3), B(1), and B(2).

2. The method of claim 1, wherein the encapsulating step includes encapsulating the message in a NetBIOS message.

3. The method of claim 2, wherein the conveying step includes submitting the message to a PTNETWORK.DLL.

4. The method of claim 1, wherein a response received from the internet is conveyed to a selected PC LAN workstation by the steps of:
   a. encapsulating the response;
   b. transporting the encapsulated response to the LAN; and
   c. extracting the response from the encapsulated response.

5. The method of claim 4, wherein the step of encapsulating the response includes encapsulating the response in a NetBIOS message.

6. The method of claim 5, wherein the step of extracting the response includes extracting the encapsulated response from the NetBIOS message.

7. A method for communicating between a network and an internet, the method comprising the steps of:

receiving, from a network workstation, an unprocessed request for services encapsulated in a message;

extracting the request from the message;

submitting the request to a TCP/IP stack;

processing the request by the TCP/IP stack; and forwarding a TCP/IP request corresponding to the request for WINSOCK services to the internet.

8. The method of claim 7, further comprising the steps of:

executing a first operating system to carry out the steps of receiving, extracting, submitting, processing and forwarding; and wherein the first operating system is different than a second operating system being executed by the network workstation.

9. The method of claim 8, wherein the first operating system operates independently of all other operating systems executing on the network.

10. The method of claim 8, wherein the first operating system is a non-PC operating system.

11. The method of claim 7, further comprising the steps of:

receiving a response to the request from the internet; and returning the response to the network workstation.

12. The method of claim 11, wherein the step of returning comprises the steps of:

encapsulating the response in a second message; and sending the second message to the network workstation.

13. The method of claim 7, wherein the step of receiving comprises the step of receiving, from the network workstation, a WINSOCK request encapsulated in a NetBIOS message.

14. The method of claim 7, wherein the step of receiving comprises the step of receiving, from the network workstation, a WINSOCK request encapsulated in a message conforming to an IPX protocol.

15. The method of claim 7, wherein the step of receiving comprises the step of receiving, from a personal computer coupled to a local area network (LAN), a WINSOCK request encapsulated in a message.

16. An apparatus for communicating between a network and an internet, the apparatus comprising:

a TCP/IP stack;

an interface, coupled to the TCP/IP stack, to receive, from a network workstation, an unprocessed request for WINSOCK services encapsulated in a message, to extract the request from the message, and to submit the request to the TCP/IP stack; and wherein the TCP/IP stack is to process the request and forward a TCP/IP request corresponding to the request for WINSOCK services to the internet.

17. The apparatus of claim 16, further comprising a first operating system which is different than a second operating system being executed by the network workstation.

18. The apparatus of claim 17, wherein the first operating system operates independently of all other operating systems executing on the network.

19. The apparatus of claim 17, wherein the first operating system is a non-PC operating system.

20. The apparatus of claim 16, wherein the TCP/IP stack is further operative to receive a response to the request from the internet, and wherein the interface is further operative to return the response to the network workstation.

21. The apparatus of claim 20, wherein the interface is further operative to encapsulate the response in a second message and send the second message to the network workstation.

22. The apparatus of claim 16, wherein the interface is further operative to receive, from the network workstation, a WINSOCK request encapsulated in a NetBIOS message.

23. The apparatus of claim 16, wherein the interface is further operative to receive, from the network workstation, a WINSOCK request encapsulated in a message conforming to an IPX protocol.

24. The apparatus of claim 16, wherein the interface is further operative to receive, from a personal computer coupled to a local area network (LAN), a WINSOCK request encapsulated in a message.

25. A system comprising:

a workstation including a first interface to receive an unprocessed request for WINSOCK services, to encapsulate the unprocessed request in a message, and to transmit the message on a network;

a server including a TCP/IP stack, a second interface, coupled to the TCP/IP stack, to receive the message from the workstation, to extract the request from the message, and to submit the request to the TCP/IP stack, wherein the TCP/IP stack is to process the request and forward a TCP/IP request corresponding to the request for WINSOCK services to an internet.

26. The system of claim 25, wherein the server executes a first operating system and the workstation executes a second operating system, and wherein the first operating system and the second operating system are different operating systems.

27. The system of claim 26, wherein the first operating system operates independently of all other operating systems executing on the network.

28. The system of claim 26, wherein the first operating system is a non-PC operating system.

29. The system of claim 25, wherein the TCP/IP stack is further operative to receive a response to the request from the internet, and wherein the second interface is further operative to return the response to the workstation.

30. The system of claim 29, wherein the second interface is further operative to encapsulate the response in a second message and send the second message to the workstation.

31. The system of claim 25, wherein the second interface is further operative to receive, from the workstation, a WINSOCK request encapsulated in a NetBIOS message.

32. The system of claim 25, wherein the second interface is further operative to receive, from the workstation, a WINSOCK request encapsulated in a message conforming to an IPX protocol.

33. The system of claim 25, wherein the workstation comprises a personal computer and the network comprises a local area network (LAN).

34. A computer-readable medium having stored thereon a plurality of instructions, designed to be executed by a processor, for implementing a function to:

receive, from a network workstation, an unprocessed request for WINSOCK services encapsulated in a message;

extract the request from the message;

submit the request to a TCP/IP stack;

process the request by the TCP/IP stack; and forward a TCP/IP request corresponding to the request for WINSOCK services to an internet.

35. The computer-readable medium of claim 34, wherein the plurality of instructions are further for implementing a function to:

receive a response to the request from the internet; and return the response to the network workstation.

36. The computer-readable medium of claim 35, wherein the plurality of instructions are further for implementing a function to:

encapsulate the response in a second message; and send the second message to the network workstation.

37. The computer-readable medium of claim 34, wherein the plurality of instructions are further for implementing a function to receive, from the network workstation, a WINSOCK request encapsulated in a NetBIOS message.

38. The computer-readable medium of claim 34, wherein the plurality of instructions are further for implementing a function to receive, from the network workstation, a WINSOCK request encapsulated in a message conforming to an IPX protocol.

39. The computer-readable medium of claim 34, wherein the plurality of instructions are further for implementing a function to receive, from a personal computer coupled to a local area network (LAN), a WINSOCK request encapsulated in a message.

* * * * *